US012614787B2

(12) United States Patent
Chi et al.

(10) Patent No.: US 12,614,787 B2
(45) Date of Patent: Apr. 28, 2026

(54) BATTERY CASE SHAPING APPARATUS AND METHOD USING SHOCK WAVE

(71) Applicant: LG Energy Solution, Ltd., Seoul (KR)

(72) Inventors: Ho June Chi, Daejeon (KR); Hang June Choi, Daejeon (KR); Jeong Oh Moon, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 330 days.

(21) Appl. No.: 17/925,769

(22) PCT Filed: Oct. 15, 2021

(86) PCT No.: PCT/KR2021/014296
§ 371 (c)(1),
(2) Date: Nov. 16, 2022

(87) PCT Pub. No.: WO2022/092642
PCT Pub. Date: May 5, 2022

(65) Prior Publication Data
US 2023/0198055 A1 Jun. 22, 2023

(30) Foreign Application Priority Data
Oct. 28, 2020 (KR) ........................ 10-2020-0141037

(51) Int. Cl.
*H01M 50/105* (2021.01)
*H01M 10/04* (2006.01)
*H01M 10/058* (2010.01)

(52) U.S. Cl.
CPC ..... *H01M 50/105* (2021.01); *H01M 10/0404* (2013.01); *H01M 10/058* (2013.01)

(58) Field of Classification Search
CPC ........... H01M 10/058; H01M 10/0404; B21D 26/12; B21D 26/14
See application file for complete search history.

(56) References Cited

U.S. PATENT DOCUMENTS 3,248,917 A * 5/1966 Herring, Jr. ............ B21D 26/06
                                                    29/421.2
5,540,075 A    7/1996 Hall, Jr.
                    (Continued)

FOREIGN PATENT DOCUMENTS

CN     110000283 A    7/2019
CN     110114162 A    8/2019
                    (Continued)

OTHER PUBLICATIONS

Extended European Search Report including Written Opinion for Application No. 21886636.6 dated Jan. 25, 2024, pp. 1-7.
                    (Continued)

*Primary Examiner* — Alison L Hindenlang
*Assistant Examiner* — Debjani Roy
(74) *Attorney, Agent, or Firm* — Lerner David LLP

(57) ABSTRACT

A battery case shaping apparatus and method shape a pouch-shaped battery case. The battery case shaping apparatus includes a conductive liquid and positive and negative electrodes each configured to generate electric discharge in the conductive liquid in order to prevent a laminate sheet for battery cases from being damaged by friction between a punch and a die and to allow the entirety of the laminate sheet to be elongated.

7 Claims, 5 Drawing Sheets

(56) References Cited

U.S. PATENT DOCUMENTS

| | | | |
|---|---|---|---|
| 9,802,237 B2 | 10/2017 | Moncho | |
| 2004/0074274 A1 | 4/2004 | Donhauser et al. | |
| 2015/0033815 A1 | 2/2015 | Moncho | |
| 2015/0360275 A1* | 12/2015 | Avrillaud | B21D 22/02 |
| | | | 72/56 |
| 2017/0095855 A1* | 4/2017 | Niaraki | B21D 26/14 |
| 2019/0299270 A1 | 10/2019 | Avrillaud et al. | |
| 2020/0153025 A1 | 5/2020 | Kim et al. | |
| 2021/0242485 A1 | 8/2021 | Kim et al. | |

FOREIGN PATENT DOCUMENTS

| | | | |
|---|---|---|---|
| JP | 2004520938 A | 7/2004 | |
| JP | 5959205 B2 | 8/2016 | |
| KR | 20140126968 A | 11/2014 | |
| KR | 101467859 B1 | 12/2014 | |
| KR | 20170124882 A | 11/2017 | |
| KR | 20190098581 A | 8/2019 | |
| KR | 20200054054 A | 5/2020 | |
| KR | 1020200054054 * | 5/2020 | |

OTHER PUBLICATIONS

International Search Report for Application No. PCT/KR2021/014296 mailed Jan. 24, 2022, 2 pages.

* cited by examiner

BATTERY CASE SHAPING APPARATUS AND METHOD USING SHOCK WAVE

CROSS-REFERENCE TO RELATED APPLICATIONS

The present application is a national phase entry under 35 U.S.C. § 371 of International Application No. PCT/KR2021/014296, filed on Oct. 15, 2021, and now published as International Publication No. WO 2022/092642 A1, which claims priority from Korean Patent Application No. 10-2020-0141037, filed on Oct. 28, 2020, all of which are hereby incorporated herein by reference in their entireties.

FIELD

The present invention relates to a battery case shaping apparatus using a shock wave and a battery case shaping method using the same. More particularly, the present invention relates to a battery case shaping apparatus using a shock wave capable of reducing friction between a punch and a die and extending an elongation range of a laminate sheet in a process of shaping a pouch-shaped battery case, thereby improving shapeability of the battery case, and a battery case shaping method using the same.

BACKGROUND

Demand for a secondary battery as an energy source for mobile devices, electric vehicles, etc. has abruptly increased. In particular, demand for a lithium secondary battery, which has high energy density and high discharge voltage, is high.

Based on the material of a case, the lithium secondary battery may be classified as a cylindrical secondary battery made of a metal material, a prismatic secondary battery made of a metal material, or a pouch-shaped secondary battery made of a laminate sheet. The pouch-shaped secondary battery has advantages in that the pouch-shaped secondary battery is stacked with high integrity, thereby having high energy density per unit weight, is manufactured at low cost, and is easily deformable. Consequently, the pouch-shaped secondary battery is used in various devices.

The pouch-shaped secondary battery uses a laminate sheet including an outer coating layer, a metal blocking layer, and an inner adhesive layer as a battery case, and is configured to have a structure in which an electrode assembly is received in a receiving portion formed in the laminate sheet together with an electrolytic solution.

In order to shape an electrode assembly receiving portion in the pouch-shaped secondary battery, a deep drawing method of disposing a laminate sheet on a die, fixing the laminated sheet using a holder, and pressing the laminate sheet using a punch is used. During deep drawing, however, external defects, such as pinholes or cracks, are formed on the outer surface of the laminate sheet due to limited ductility of the laminate sheet and the force of friction between the punch and the laminate sheet.

Even though surface roughness of the punch that contacts the laminate sheet is extremely reduced in order to prevent formation of such external defects, it is difficult to prevent external defects from being formed on the laminate sheet due to friction caused by repeated punching. Particularly, in the case in which the thickness of the laminate sheet, specifically the metal blocking layer, is small, shapeability of the laminate sheet is reduced, whereby pinholes or cracks may be more easily formed. For this reason, it is difficult to shape the electrode assembly receiving portion so as to have a large depth, whereby it is difficult to manufacture a high-capacity lithium secondary battery.

In connection therewith, Patent Document 1 discloses technology capable of pressing using pressure of liquid in a punch of a press apparatus, which includes the punch, a blank holder, and a die, and generating a pressure wave in the liquid through two electrodes to form a sheet.

However, Patent Document 1, in which an outer wall of the punch contacts the die, cannot solve a problem in that the sheet is locally elongated in a process of shaping the sheet.

Therefore, there is a high necessity for technology capable of preventing damage to the external appearance of a laminate sheet and improving shapeability during shaping of the laminate sheet.

US Patent Application Publication No. 2015-0360275 (2015 Dec. 17) ("Patent Document 1")

SUMMARY OF THE DISCLOSURE

The present invention has been made in view of the above problems, and it is an object of the present invention to provide a battery case shaping apparatus capable of reducing the force of friction between a punch configured to press a laminate sheet in order to shape a battery case and the laminate sheet due to contact therebetween, thereby preventing damage to the laminate sheet, and a battery case shaping method using the same.

In order to accomplish the above object, a battery case shaping apparatus according to the present invention includes a punch configured to press a laminate sheet for battery cases, a die located under the punch, the die having formed therein an accommodation portion corresponding to an electrode assembly receiving portion, a holder configured to fix the laminate sheet, an elastic separator coupled to the holder, the elastic separator being located under the punch, a conductive liquid configured to form a cavity due to gas generated by electric discharge, and a positive electrode and a negative electrode disposed in contact with the conductive liquid for the electric discharge.

A space may be defined by the elastic separator, the holder, to which the elastic separator is coupled, and the lower surface of the punch, and the conductive liquid may be received in the space.

A sealing member may be added to the surface of the holder that contacts the punch, among outer surfaces of the holder.

A concave portion may be formed in at least a portion of the lower surface of the punch.

The punch may include an upper punch and a lower punch, the concave portion may be formed in a central part of the lower punch, and the thickness of the lower punch excluding the central part, in which the concave portion is formed, may be gradually decreased toward the outer periphery of the lower punch, whereby the lower surface of the lower punch may be inclined.

Specifically, the elastic separator may be a watertight elastic separator.

The positive electrode and the negative electrode may be fixed to the punch in a state of extending through the punch.

The battery case shaping apparatus may further include an electricity generator coupled to the positive electrode and the negative electrode, the electricity generator being configured to supply current to the positive electrode and the negative electrode.

The present invention provides a battery case shaping method using the battery case shaping apparatus. Specifically, the present invention provides a battery case shaping method including S1) a step of disposing a laminate sheet for battery cases above the die, S2) a step of filling the holder, to which the elastic separator is coupled, with the conductive liquid, S3) a first shaping step of pressing the elastic separator and the laminate sheet using the punch, and S4) a second shaping step of supplying current to the conductive liquid, wherein the positive electrode and the negative electrode are mounted to the punch.

The first shaping step and the second shaping step may be sequentially performed.

The punch and the elastic separator may not contact each other due to the conductive liquid, and step S2) may be performed before step S1).

In the first shaping step, the bottom of an electrode assembly receiving portion may be shaped into a curved surface that is convex at a central part thereof.

The second shaping step may include a process in which a spark is generated by the current supplied to the positive electrode and the negative electrode, a cavity abruptly expands due to gas generated by the spark, and the conductive liquid is pressurized by the expansion, whereby the elastic separator pushes the laminate sheet so as to come into tight contact with the surface of the die.

In addition, the present invention provides a battery case manufactured using the battery case shaping apparatus, wherein the thicknesses of a bottom and a side surface constituting an electrode assembly receiving portion may be equal to each other.

The thickness of each of the bottom and the side surface of the electrode assembly receiving portion may be less than the thickness of a sealed portion.

In addition, the present invention may provide all possible combinations of the above solving means.

As is apparent from the above description, in the present invention, an electrode assembly receiving portion is shaped in the state in which an elastic separator is interposed between a laminate sheet and a punch, whereby it is possible to prevent direct contact between the punch and the laminate sheet, and therefore it is possible to minimize a stick-slip effect that occurs on the surface of the punch and the surface of the laminate sheet, and it is possible to prevent the laminate sheet from being damaged by the punch.

In addition, a battery case is shaped in the state in which a conductive liquid is received in the elastic separator, whereby pressing force of the punch is transmitted to the elastic separator through the surface of the conductive liquid.

In addition, since the battery case is shaped using a shock wave due to pressure of gas generated by supplying current to an electrode inserted into the conductive liquid, pressing force is distributed to the entire area of the elastic separator that abuts the laminate sheet, whereby the entirety of the laminate sheet is uniformly elongated.

In the present invention, as described above, it is possible to reduce frictional force during a manufacturing process and to prevent the thickness of a side wall of the electrode assembly receiving portion of the battery case from being locally excessively reduced, whereby it is possible to prevent pinholes or cracks from being formed in the battery case.

Also, in the case in which a battery case shaping apparatus and method according to the present invention are used even though laminate sheets having the same thickness are used, it is possible to more deeply form the electrode assembly receiving portion, and therefore it is possible to increase capacity of a battery cell and to improve energy density of the battery cell.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 1:
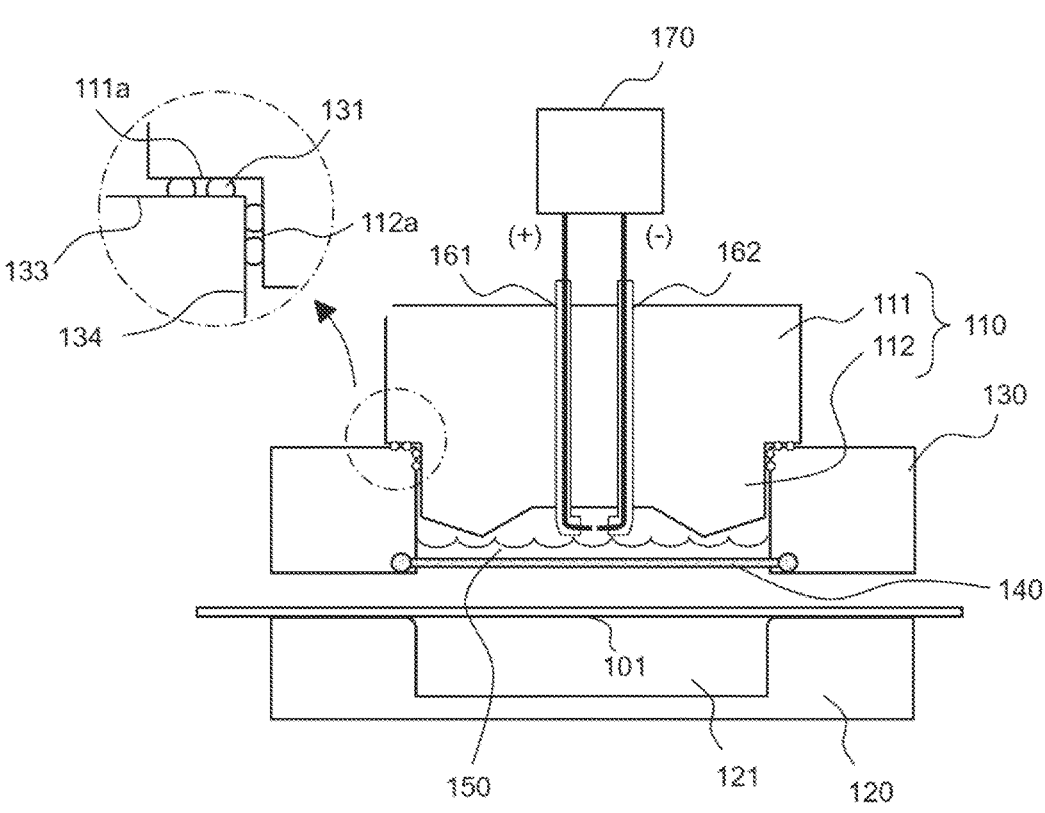
FIG. 1 is a cross-sectional elevation view of a battery case shaping apparatus according to an embodiment.

FIG. 1 is a cross-sectional elevation view of a battery case shaping apparatus according to an embodiment.

Referring to FIG. 1, the battery case shaping apparatus 100 includes a punch 110 configured to press a laminate sheet 101 for battery cases, a die 120 located under the punch 110, the die having formed therein an accommodation portion 121 corresponding to an electrode assembly receiving portion, a holder 130 configured to fix the laminate sheet 101, an elastic separator 140 coupled to the holder 130, the elastic separator being located under the punch 110, a conductive liquid 150 configured to form a cavity due to gas generated by electric discharge, and a positive electrode 161 and a negative electrode 162 disposed in contact with the conductive liquid 150 for electric discharge.

In order to manufacture a pouch-shaped battery case using the laminate sheet 101, the laminate sheet 101 is disposed on the die 120 having formed therein the accommodation portion 121 having a size corresponding to the electrode assembly receiving portion, and the outer periphery of the laminate sheet 101 is fixed to the die using the holder 130. The fixed laminate sheet 101 is pressed by the punch 110, whereby the electrode assembly receiving portion may be shaped.

At this time, in order to prevent direct contact between the laminate sheet 101 and the punch 110, the elastic separator 140 is disposed between the laminate sheet 101 and the punch 110.

If the laminate sheet and the punch directly contact each other, slip does not easily occur due to friction between the surfaces of the laminate sheet and the punch. As a result, the region of the laminate sheet that is elongated is narrowed, and therefore only a local region of the laminate sheet is elongated. Specifically, since the portion of the laminate sheet that becomes a side wall of the electrode assembly receiving portion when the laminate sheet is shaped into a battery case is mainly elongated, the thickness of the portion is excessively reduced. As a result, the battery case is easily damaged.

Since a stick-slip phenomenon easily occurs on the surface of the laminate sheet and the surface of the punch, as described above, the laminate sheet may be locally excessively elongated, and therefore a battery case shaping defect rate may be increased.

The laminate sheet 101 is pressed by the punch 110 in the state in which the elastic separator 140 is disposed between the laminate sheet 101 and the punch 110, and therefore the surface of the laminate sheet 101 and the surface of the punch 110 do not directly contact each other. Consequently, it is possible to solve a conventional problem in that the laminate sheet 101 is scratched due to a non-smooth surface of the punch 110 or introduction of foreign matter between the punch and the laminate sheet.

The elastic separator 140 may be securely fixed in the holder 130. Even though the laminate sheet 101 is pressed by the punch 110, therefore, stable fixing of the elastic separator 140 may be guaranteed.

For example, the elastic separator 140 may be attached to the lower surface of the holder 130 or may be fixed to the lower part of the side surface of the holder 130. When the elastic separator 140 is attached to the lower surface of the holder 130, the force of fixing the laminate sheet 101 may be further increased by a microscopically protruding portion formed as the result of coupling between the elastic separator 140 and the holder 130. Alternatively, when the elastic separator 140 is fixed to the lower part of the side surface of the holder 130, particularly when the elastic separator 140 is inserted into and fixed to a recess formed in the lower part of the side surface of the holder 130, the force of coupling between the elastic separator 140 and the holder 130 is further increased. As a result, coupling between the elastic separator and the holder is maintained even when the elastic separator 140 is excessively elongated. When the depth of the receiving portion is large, a more advantageous effect may be achieved.

The conductive liquid 150 is added between the punch 110 and the elastic separator 140. At this time, the conductive liquid 150 is added to such an extent that the punch 110 and the elastic separator 140 do not contact each other.

Specifically, the conductive liquid 150 may serve as a medium that transmits pressing force of the punch 110, and furthermore may transmit a uniform shock wave to the entire area of the elastic separator 140.

Referring to FIG. 1, a space is defined by the elastic separator 140, the holder 130, to which the elastic separator 140 is coupled, and the lower surface of the punch 110, and the conductive liquid 150 is received in the space.

Preferably, the elastic separator 140 is a watertight elastic separator. When the punch 110 is moved downwards, the volume of the space defined by the lower surface of the punch 110, the holder 130, and the elastic separator 140 is reduced, whereby the conductive liquid 150 is pressurized, and the pressurized conductive liquid 150 deforms the elastic separator 140 into a curved surface while moving downwards.

Since the pressing force applied to the deformed elastic separator 140 is uniformly applied to the entire area of the laminate sheet 101, the laminate sheet 101 is also deformed into the same shape as the deformed elastic separator 140.

The pressure in the space in which the conductive liquid 150 is received may be increased by the pressing force of the punch 110. In order to prevent the conductive liquid 150 from being discharged from the space, a sealing member 131 may be added to surfaces 133 and 134 of the holder 130 that contact the punch 110, among outer surfaces of the holder 130. For example, the sealing member 131 may be an O-ring made of an elastic material.

Figure 2:
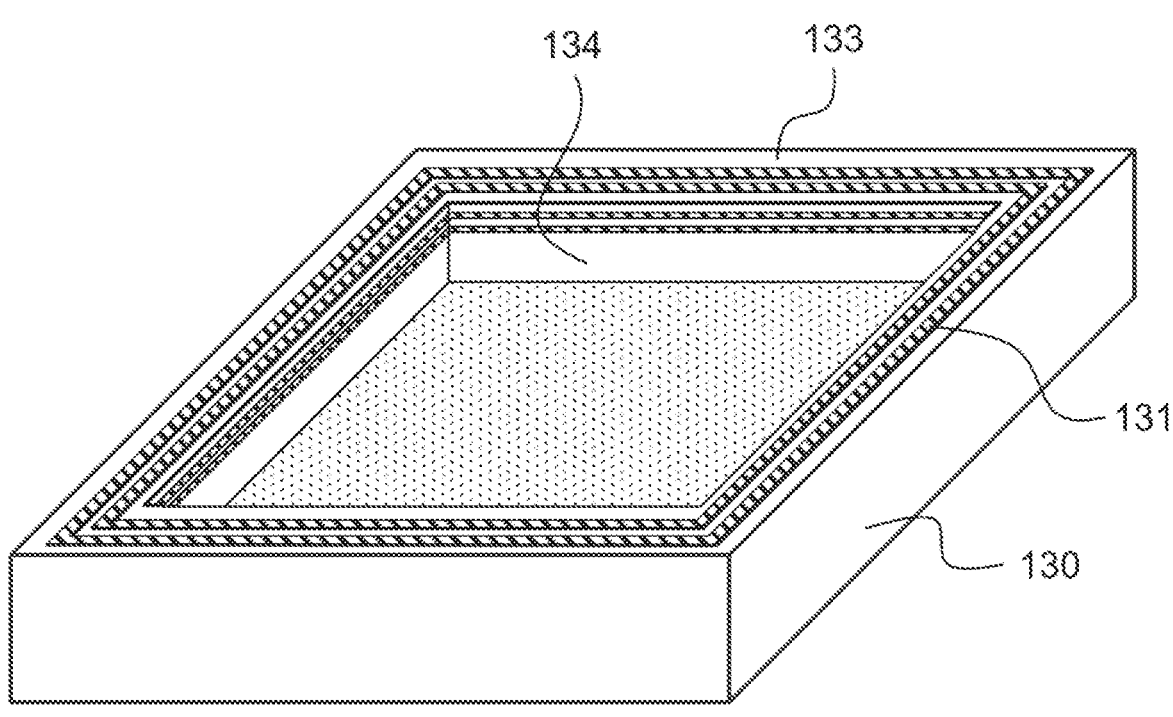
FIG. 2 is an upper perspective view of a holder according to an embodiment.

In connection therewith, FIG. 2 is an upper perspective view of the holder 130 according to an embodiment.

Referring to FIGS. 1 and 2, two quadrangular ring-shaped sealing members 131 are attached to an upper surface 133 of the holder 130, and two quadrangular ring-shaped sealing members 131 are also attached to an inner surface 134 of the holder 130.

The punch 110 of FIG. 1 includes an upper punch 111 and a lower punch 112. The inner surface 134 of the holder is a surface that faces a side surface 112a of the lower punch inserted into the holder 130, and the upper surface 133 of the holder is a surface that faces a lower surface 111a of the upper punch when the punch 110 is completely inserted into the holder.

The sealing member 131 is added to the surfaces of the holder 130 and the punch 110 that face each other, whereby the elastic separator 140 may be pushed without discharge of the conductive liquid 150.

The positive electrode 161 and the negative electrode 162 are disposed in contact with the conductive liquid 150, and an electricity generator 170 is coupled to the positive electrode 161 and the negative electrode 162 in order to supply current thereto. The positive electrode 161 and the negative electrode 162 may be electrodes, polarities of which are not fixed. At this time, the electricity generator 170 may generate alternating current.

When very high current flows to the positive electrode 161 and the negative electrode 162 for a very short time through the electricity generator 170, electric discharge occurs between the positive electrode 161 and the negative electrode 162. The temperature of the conductive liquid 150 is abruptly increased by electric discharge, whereby the conductive liquid is evaporated, and therefore the volume of the conductive liquid is abruptly increased. As a result, a cavity is formed. When the cavity extremely expands, a shock wave is generated in the conductive liquid. In the conductive liquid, the shock wave is propagated in all directions, and energy of the shock wave strongly pushes the elastic separator and the laminate sheet to the outer edge of the accommodation portion of the die.

Since the shock wave generated as the result of evaporation of the conductive liquid 150 expands the elastic separator 140 in all directions, as described above, the laminate sheet 101 may be pushed to the inner surface of the die, whereby the electrode assembly receiving portion may be shaped.

It is preferable for the shock wave to be used in order to further press minute portions of the laminate sheet 101 after the laminate sheet is shaped to some extent by pressing of the punch 110, rather than being added from the beginning.

The kind of the conductive liquid 150 is not particularly restricted as long as the conductive liquid exhibits high electrical conductivity, low volatility, and high chemical stability. For example, water; an electrolyte solution, such as sodium chloride, sulfuric acid, hydrochloric acid, sodium hydroxide, potassium hydroxide, or sodium nitrate; or an organic solvent used as an electrolytic solution for secondary batteries may be used.

When the punch is disposed above the laminate sheet, the positive electrode 161 and the negative electrode 162 are in contact with the conductive liquid. Alternatively, when the elastic separator and the laminate sheet are pushed using at least the punch, the positive electrode 161 and the negative electrode 162 mounted to the punch move downwards and come into contact with the conductive liquid 150. Consequently, the positive electrode 161 and the negative electrode 162 may be fixed to the punch 110 in a state of extending through the punch 110. Alternatively, the positive electrode 161 and the negative electrode 162 may be fixed to the holder 130 in a state of extending through the holder 130, and the positive electrode and the negative electrode may protrude from the inner surface of one side of the holder 130 toward the place at which the conductive liquid 150 is added.

Even in the case in which the positive electrode and the negative electrode are fixed to the punch 110 or the holder 130, as described above, airtightness must be secured in order to prevent the conductive liquid 150 from being discharged from the space formed between the interior of the holder 130 and the lower surface of the punch 110 to the outside.

Figure 3:
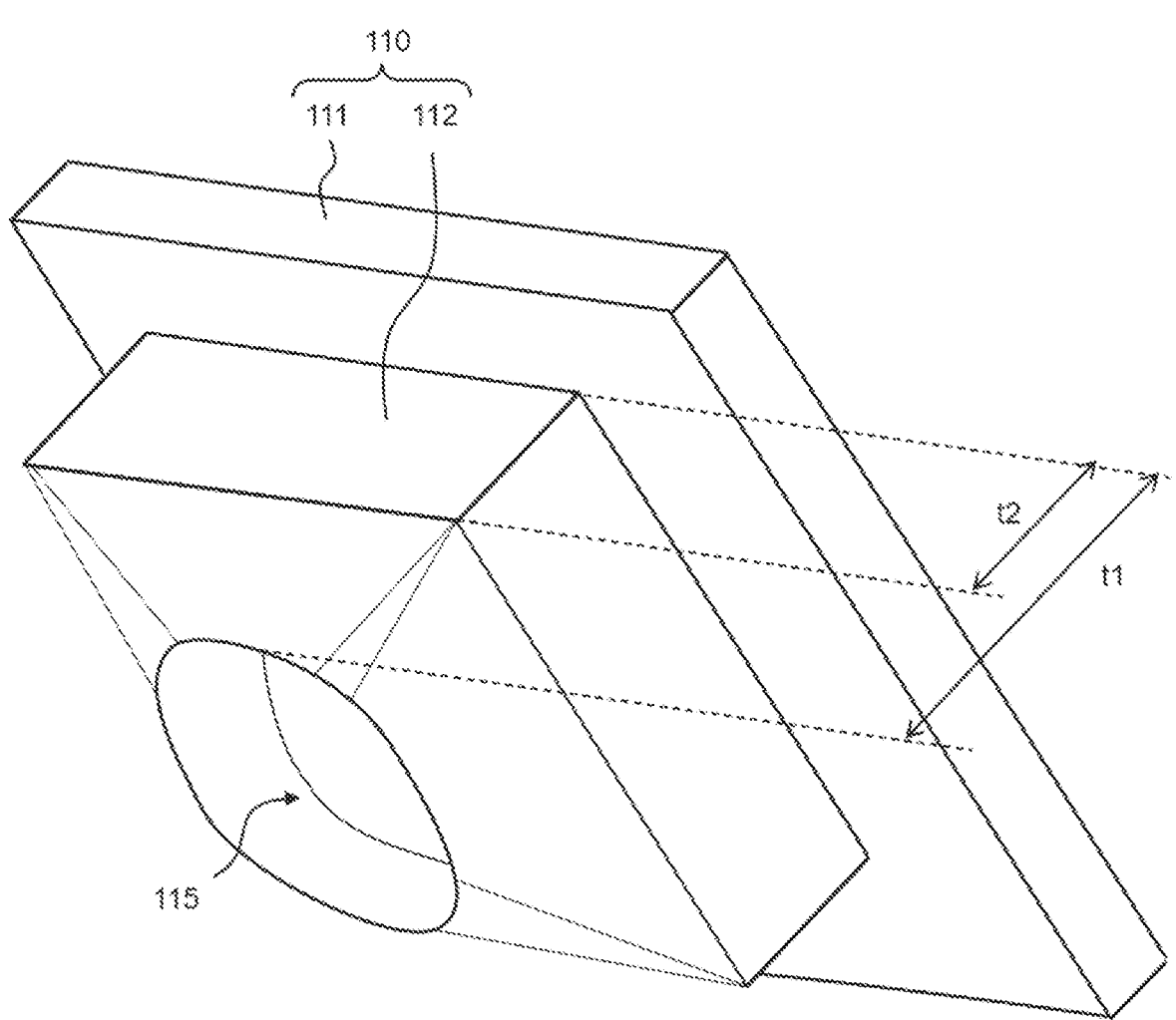
FIG. 3 is a lower perspective view of a punch according to an embodiment.

FIG. 3 is a lower perspective view of the punch 110 according to an embodiment.

Referring to FIG. 3, a concave portion 115 may be formed in at least a portion of the lower surface of the lower punch 112.

It is preferable for the concave portion 115 to be formed in a central part of the lower surface of the punch 110 in order to prevent the conductive liquid 150 from moving to the outer periphery of the elastic separator 140 at once when the punch 110 is moved downwards.

In the case in which the concave portion 115 is formed in the central part of the lower surface of the punch 110, as described above, it is possible to obtain an effect of the conductive liquid 150 being gathered in the concave portion 115. In addition, since water pressure is better transmitted in proportion to the amount of the liquid gathered in the concave portion 115, the central part of the punch 110 is deformed into a convex shape, which is the most prominent, and the concave portion 115 is added thereto.

Meanwhile, the lower punch 112 is formed such that the thickness t1 of the central part of the lower punch 112 is greater than the thickness t2 of the outer periphery of the lower punch 112, excluding the concave portion 115 formed in the central part of the lower punch 112. Consequently, the lower surface of the lower punch 112 is inclined.

The laminate sheet 101 is pushed to the entirety of the accommodation portion 121 of the die 120 by a shock wave generated when the conductive liquid 150 is instantaneously evaporated, whereby the battery case is shaped. Since the thickness t2 of the outer periphery of the lower punch 112 is formed thinner than the central part of the lower punch, the shock wave may be propagated far away up to the outer periphery of the elastic separator 140.

Figure 4:
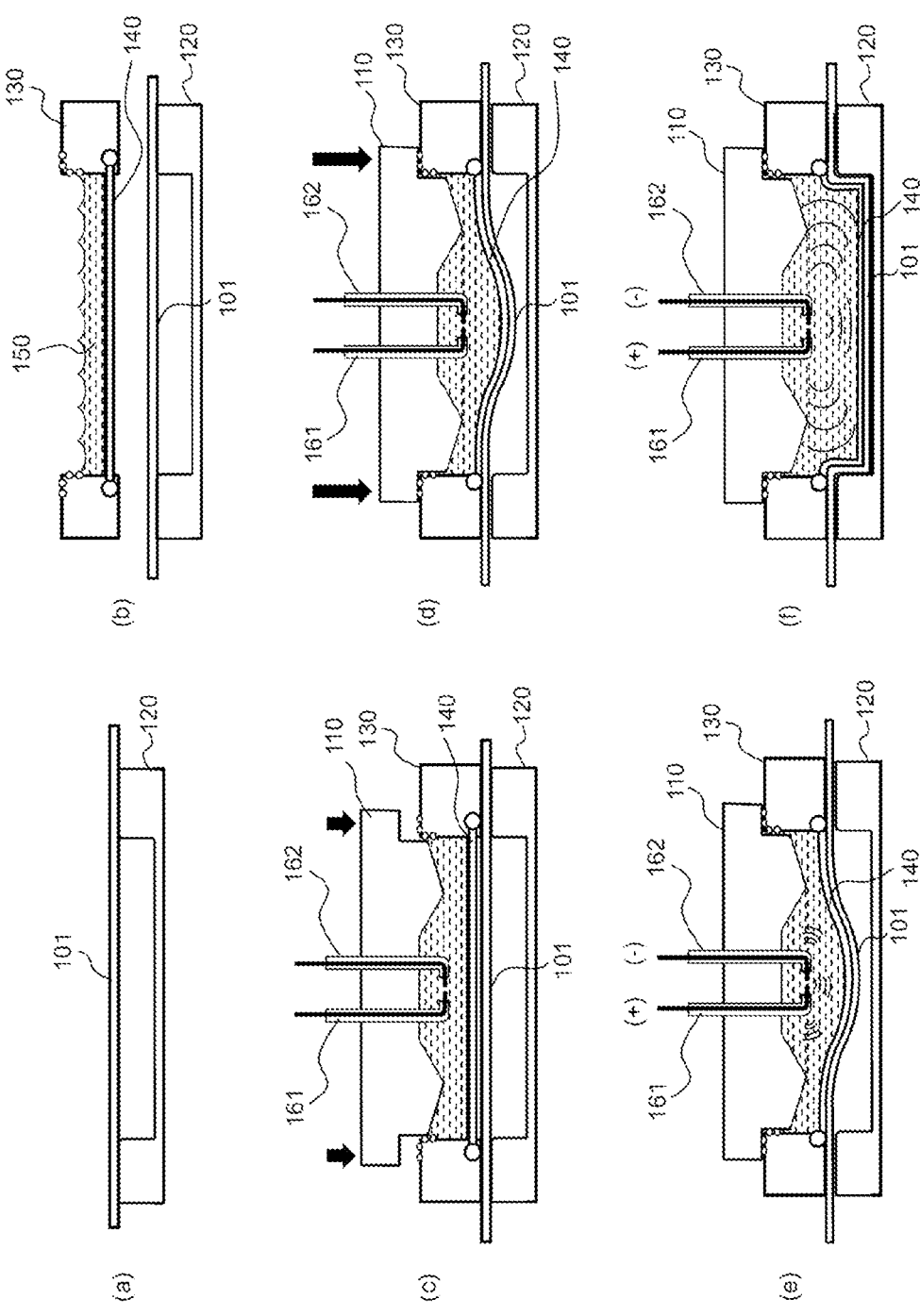
FIG. 4 are cross-sectional views sequentially showing a battery case shaping process according to an embodiment.

FIG. 4 are cross-sectional views sequentially showing a battery case shaping process according to an embodiment.

Referring to FIG. 4, a battery case shaping method according to the present invention includes a step of disposing a laminate sheet 101 for battery cases above a die 120, a step of filling a holder 130, to which an elastic separator 140 is coupled, with a conductive liquid 150, a first shaping step of pressing the elastic separator 140 and the laminate sheet 101 using a punch 110, and a second shaping step of supplying current to the conductive liquid 150. The step of filling the holder 130, to which the elastic separator 140 is coupled, with the conductive liquid 150 may be performed first.

The first shaping step and the second shaping step may be sequentially performed. The first shaping step is performed in an initial pressing state in which the elastic separator 140 and the laminate sheet 101 are not completely pressed.

Alternatively, the first shaping step and the second shaping step may be simultaneously performed. The elastic separator 140 may be pressed using the punch 110, and at the same time current may be supplied to the positive electrode 161 and the negative electrode 162 in order to generate a shock wave.

In the second shaping step, in which the shock wave is used, a process may be performed in which a spark is generated by the current supplied to the positive electrode 161 and the negative electrode 162, a cavity abruptly expands due to gas generated by the spark, and the conductive liquid 150 is pressurized by such expansion, whereby the elastic separator 140 pushes the laminate sheet 101 so as to come into tight contact with the surface of the die 120.

Figure 5:
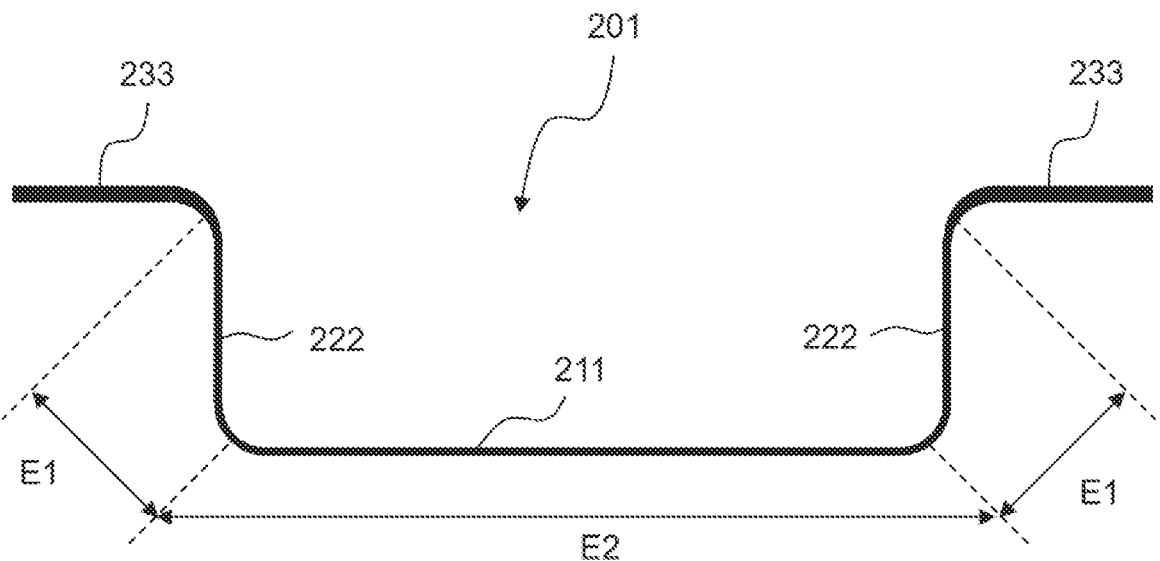
FIG. 5 is an cross-sectional elevation view of a battery case manufactured using the battery case shaping apparatus of FIG. 1.

FIG. 5 is a cross-sectional elevation view of a battery case manufactured using the battery case shaping apparatus 100 of FIG. 1.

Referring to FIG. 5, the battery case includes an electrode assembly receiving portion 201, constituted by a bottom 211 and a side surface 222, and a sealed portion 233.

In the present invention, since uniform pressure is applied to the entirety of the elastic separator by the shock wave, the entirety of the laminate sheet extended into the die may be uniformly elongated.

Consequently, the thicknesses of the bottom 211 and the side surface 222 constituting the electrode assembly receiving portion 201 are equal to each other, or there is no great difference therebetween.

In addition, the sealed portion 233, which is a portion fixed to the die 120 by the holder 130, is not elongated. Consequently, the thickness of each of the bottom 211 and the side surface 222 of the elongated electrode assembly receiving portion 201 is less than the thickness of the sealed portion 233.

When compared to the case in which a conventional elongation range E1 is applied only to the side surface 222, therefore, the elongation region extends to an additional elongation range E2 according to the present invention in addition to the conventional elongation range E1 when the battery case shaping method according to the present invention is used, whereby it is possible to solve a conventional problem in that the battery case is locally elongated and thus is easily damaged.

Those skilled in the art to which the present invention pertains will appreciate that various applications and modifications are possible within the category of the present invention based on the above description.

DESCRIPTION OF REFERENCE SYMBOLS

100: Battery case shaping apparatus
101: Laminate sheet
110: Punch
111: Upper punch
111a: Lower surface of upper punch
112: Lower punch
112a: Side surface of lower punch
115: Concave portion
120: Die
121: Accommodation portion
130: Holder
131: Sealing member
133: Upper surface
134: Inner surface
140: Elastic separator
150: Conductive liquid
161: Positive electrode
162: Negative electrode
170: Electricity generator
201: Electrode assembly receiving portion
211: Bottom
222: Side surface
233: Sealed portion
E1: Conventional elongation range
E2: Additional elongation range according to present invention
t1: Thickness of central part of lower punch
t2: Thickness of outer periphery of lower punch The present invention relates to a battery case shaping apparatus using a shock wave capable of reducing friction between a punch and a die and extending an elongation range of a laminate sheet in a process of shaping a pouch-shaped battery case, thereby improving shapeability of the battery case, and a battery case shaping method using the same, and therefore the present invention has industrial applicability.

The invention claimed is:

1. A battery case shaping apparatus comprising:
a punch configured to press a laminate sheet for battery cases;

a die located under the punch, the die forming an accommodation portion corresponding to an electrode assembly receiving portion;
a holder configured to fix the laminate sheet;
an elastic separator coupled to the holder, the elastic separator being located under the punch;
a conductive liquid configured to form a cavity due to gas generated by electric discharge; and
a positive electrode and a negative electrode each disposed in contact with the conductive liquid for the electric discharge,
wherein a space is defined by the elastic separator, the holder, and a lower surface of the punch, and the conductive liquid is received in the space, and
wherein the positive electrode and the negative electrode each extend into the space between the lower surface of the punch and the elastic separator.

2. The battery case shaping apparatus according to claim 1, further comprising a sealing member added to a contacting surface of the holder that contacts the punch, the contacting surface being among outer surfaces of the holder.

3. The battery case shaping apparatus according to claim 1, wherein the punch has a lower surface and a concave portion is formed in at least a portion of the lower surface of the punch.

4. The battery case shaping apparatus according to claim 3, wherein:
the punch comprises an upper punch and a lower punch,
the concave portion is formed in a central part of the lower punch, and
a thickness of the lower punch, excluding the central part in which the concave portion is formed, is gradually decreased toward an outer periphery of the lower punch, whereby a lower surface of the lower punch is inclined.

5. The battery case shaping apparatus according to claim 1, wherein the elastic separator is a watertight elastic separator.

6. The battery case shaping apparatus according to claim 1, wherein the positive electrode and the negative electrode are each fixed to the punch in a state of extending through the punch.

7. The battery case shaping apparatus according to claim 1, further comprising an electricity generator coupled to the positive electrode and to the negative electrode, the electricity generator being configured to supply current to the positive electrode and to the negative electrode.

* * * * *